(12) United States Patent
Smith

(10) Patent No.: US 7,725,918 B2
(45) Date of Patent: May 25, 2010

(54) INTERACTIVE TELEVISION WITH EMBEDDED UNIVERSAL TIME CODES

(75) Inventor: Drake Smith, Oxford, CT (US)

(73) Assignee: Ericsson Television Inc., Duluth, GA (US)

( * ) Notice: Subject to any disclaimer, the term of this patent is extended or adjusted under 35 U.S.C. 154(b) by 1520 days.

(21) Appl. No.: 10/212,859

(22) Filed: Aug. 5, 2002

(65) Prior Publication Data

US 2003/0063217 A1    Apr. 3, 2003

Related U.S. Application Data

(60) Provisional application No. 60/309,812, filed on Aug. 3, 2001.

(51) Int. Cl.
*H04N 7/16* (2006.01)
(52) U.S. Cl. ..................... 725/136; 709/231
(58) Field of Classification Search ............ 725/136; 348/460, 468; 709/231
See application file for complete search history.

(56) References Cited

U.S. PATENT DOCUMENTS

| | | | |
|---|---|---|---|
| 6,108,706 A * | 8/2000 | Birdwell et al. ............ | 709/229 |
| 6,240,555 B1 * | 5/2001 | Shoff et al. ................. | 725/110 |
| 6,263,505 B1 | 7/2001 | Walker et al. | |
| 6,487,723 B1 * | 11/2002 | MacInnis .................... | 725/132 |
| 6,496,981 B1 * | 12/2002 | Wistendahl et al. ......... | 725/112 |
| 6,539,545 B1 * | 3/2003 | Dureau et al. ................. | 725/48 |
| 7,150,031 B1 * | 12/2006 | Rodriguez et al. ............ | 725/58 |
| 2002/0057286 A1 * | 5/2002 | Markel et al. ............... | 345/704 |
| 2005/0166257 A1 * | 7/2005 | Feinleib et al. ............. | 725/136 |

OTHER PUBLICATIONS

Advanced Television Enhancement Forum Specification (ATVEF) Release date: Aug. 1998.*

* cited by examiner

*Primary Examiner*—Brian T Pendleton
*Assistant Examiner*—Nnenna N Ekpo

(57) ABSTRACT

An interactive television (ITV) system transmitting ITV content created and received by different ITV platforms via a single ITV stream. The system provides universal time codes which are embedded into the ITV stream. Each time code is associated with a program identifier which uniquely identifies a particular program. An ITV receiver receives the ITV stream and compares the program identifier and time code with a program held in the receiver's memory. When a match is found, an interactive event indicated by the program is executed. The program may be loaded into the receiver's memory using a back channel.

19 Claims, 4 Drawing Sheets

INTERACTIVE TELEVISION WITH EMBEDDED UNIVERSAL TIME CODES

CROSS-REFERENCE TO RELATED APPLICATION(S)

This application claims the benefit of U.S. Provisional Application No. 60/309,812 filed on Aug. 3, 2001, the content of which is incorporated herein by reference.

FIELD OF THE INVENTION

The present invention relates generally to an interactive television (ITV) system and method, and more particularly, to a system and method for embedding universal triggers into an ITV program for receipt by different ITV receivers.

BACKGROUND OF THE INVENTION

Interactive television (ITV) combines conventional television with additional interactive content to present a viewer with an enhanced version of a television program or commercial. Typically, the interactive content is in some way related to the television program being viewed, such as biographical information about one of the actors in the program, additional information about a topic covered in the program, and the like. If the television program is a game show, the interactive content often allows the viewer to play along with the game. For example, a viewer may answer the same questions as the contestants on the game show.

In order to allow a viewer to experience an enhanced television program, a broadcaster encodes a television program with ITV data and broadcasts the encoded television program to the viewers. The ITV data may take many forms, such as, for example, HTML, XML, JAVA, or JAVA Script commands. If the receiving viewer's television system is equipped with an ITV receiver, the ITV receiver may decode the embedded ITV data for accessing the associated interactive content or performing an action indicated by the command.

A problem that often arises in providing an ITV program is that there may be different, dissimilar types of ITV receivers receiving the ITV program. For example, one ITV receiver may be configured with an HTML based platform while another receiver may be configured with a JAVA based platform. Similarly, there may be more than one organization responsible for developing the interactive content. Each organization may develop the interactive content using a different ITV platform. Consequently, the unique ITV data generated by one organization using one type of platform may be different, and unusable, by a receiver configured to receive and decode ITV data generated by a different organization using a different type of platform.

One approach in solving the above problem is to generate and transmit, for a particular television program, a separate ITV stream for each type of ITV platform. Each ITV stream would therefore be tailored to a particular receiver's needs. Transmitting multiple content streams, however, is laborious and results in an inefficient use of bandwidth.

Accordingly, what is desired is a system and method for transmitting ITV content created and received by different ITV platforms without having to generate and deliver content streams catered to each individual platform.

SUMMARY OF THE INVENTION

The present invention is directed to transmitting ITV content created and received by different ITV platforms via a single ITV stream. According to one embodiment, the invention is directed to an ITV system that includes a transmitter transmitting an ITV signal embedded with a universal code. The ITV system further includes a first ITV receiver that includes a first memory storing the universal code and a first ITV command generated according to a first ITV platform, and a second ITV receiver that includes a second memory storing the universal code and a second ITV command generated according to a second ITV platform. Each ITV receiver retrieves the universal code from the ITV program, searches for the universal code in its respective memory, retrieves from the memory the stored ITV command associated with the universal code, and controls the first ITV receiver according to the retrieved ITV command.

According to one embodiment of the invention, the universal code is a time code indicative of a time in which a particular ITV event is to occur.

The present invention is also directed to a method for providing an ITV program where the method includes receiving the ITV program at an ITV receiver. The ITV program is encoded with a universal code that is associated with a discrete ITV command. The method further includes retrieving the universal code from the ITV program, searching for the universal code in a memory resident in the ITV receiver, retrieving from the memory the discrete ITV command associated with the universal code, and controlling the ITV receiver according to the discrete ITV command.

The present invention is further directed to an ITV program receiver that includes a video input receiving an ITV program encoded with a universal code where the universal code is associated with a discrete ITV command. The ITV receiver also includes a memory storing the discrete ITV command and associated universal code. A processor coupled to the video input and the memory is configured to retrieve the universal code from the ITV program, search the memory for the universal code, retrieve the discrete ITV command associated with the universal code from the memory, and execute the ITV command.

According to one embodiment of the invention, the ITV receiver further includes a network interface receiving the discrete ITV command for storing the memory.

It should be appreciated, therefore, that the present invention allows any number of ITV events to be synchronized to a particular television program without having to embed discrete commands generated according to a variety of differing formats for a variety of disparate ITV receivers. The present invention therefore allows efficient use of bandwidth while catering to different types of ITV receivers.

DETAILED DESCRIPTION

Figure 1:
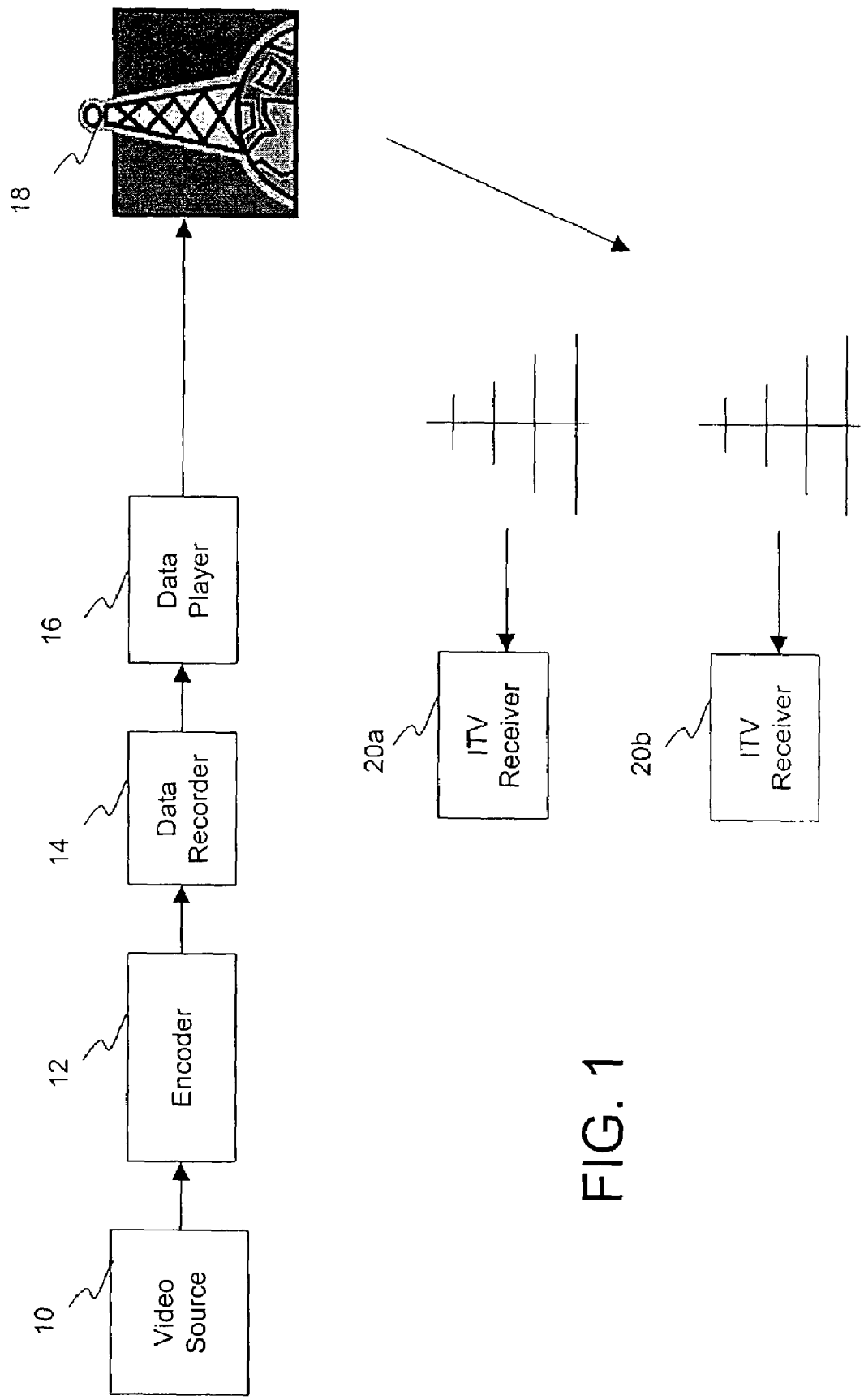
FIG. 1 is a block diagram of an ITV system according to one embodiment of the invention.

FIG. 1 is a block diagram of an ITV system according to one embodiment of the invention. The ITV system illustrated in FIG. 1 includes an encoder 12 coupled to a video source 10.

The video source 10 provides live or recorded video programs to the encoder 12 for embedding ITV data into the video program. The ITV data may be embedded, for example, in a vertical blanking interval (VBI) (for example, line 21), or an MPEG 2 private data field (or a similar field of additional video formats) of the video portion of the program.

The encoder 12 may be an encoder conventional in the art, such as, for example, a DV2000 universal data encoder or ITV Injector, marketed by Ultech LLC, Middlebury, Conn. The video source 10 may be a camera, VCR, betacam, DVD player, PC, CD-ROM player, or any other device capable of delivering a video feed to the encoder 12.

Once the ITV data is encoded into a video program, the modified program is output by the encoder 12 and may be recorded by a data recorder 14 for subsequent broadcast. At an appropriate time, the video program with the embedded ITV data is broadcast via a data player 16 and a broadcast station 18.

A television program with embedded ITV data is received by different ITV receivers 20a, 20b (collectively referenced as 20). The ITV receivers 20 may take the form of set-top boxes, digital cable boxes, televisions with embedded set-top box functionality, or other suitable devices with ITV related software, middleware, and/or hardware. According to one embodiment of the invention, ITV receiver 20a includes a first type of ITV platform, such as, for example, an HTTP based platform, while ITV receiver 20b includes a second type of ITV platform, such as, for example, a JAVA based platform.

According to one embodiment of the invention, instead of generating different ITV streams for controlling different types of ITV receivers, a single ITV stream is generated and broadcast for a given television program. The single ITV stream includes universal codes that may be decoded and interpreted by the different ITV receivers irrespective of their ITV platform. The universal codes help identify particular ITV commands that are preloaded into a receiver according to the receiver's particular ITV platform. In this manner, the discrete ITV commands themselves need not be embedded into the ITV program. Instead, their associated universal codes may be embedded and broadcast with the ITV program to different ITV receivers.

Figure 2:
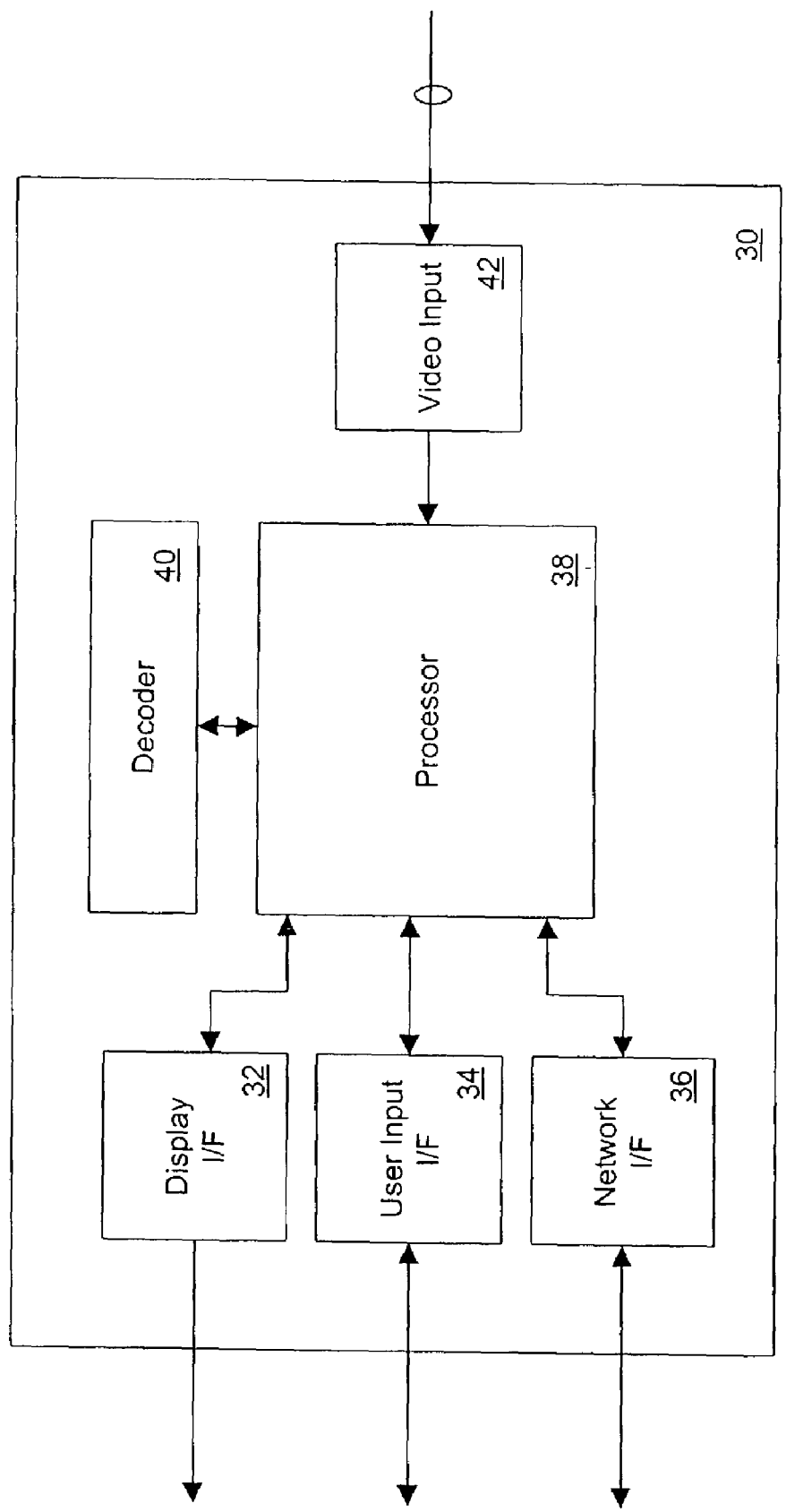
FIG. 2 is a block diagram of an exemplary ITV receiver according to one embodiment of the invention.

FIG. 2 is a more detailed block diagram of an exemplary ITV receiver 30 according to one embodiment of the invention. ITV receiver 30 may be, for example, similar to ITV receiver 20a or 20b of FIG. 1. The exemplary ITV receiver 30 includes a video input 42 for receiving an ITV program broadcast from a broadcast station. The received ITV program is transmitted to an ITV processor 38 coupled to a decoder 40. Together, the ITV processor 38 and the decoder 40 cause the execution of relevant ITV commands for triggering ITV events and displaying relevant ITV content via a display interface 32. According to one embodiment of the invention, the ITV commands are synchronized with the received television program. For example, if the television program is an interactive game show, ITV commands may be inserted into the program to display game show questions to an ITV viewer in a manner that is synchronized with the questions that a studio contestant may see in the studio. Furthermore, ITV commands may be timed to prevent ITV viewers at home from answering a question after a studio contestant has pressed a button to answer the question.

An ITV viewer interacts with the interactive program via a remote control unit, keypad, keyboard, or the like. The input provided by the user is transmitted to the ITV receiver 30 via a user input interface 34. After receipt by the ITV receiver, a user input may be transmitted to a head end or any other interested organization over a back channel via a network interface 36. The back channel may take the form of any type of communication channel known in the art, such as, for example, a telephone or Internet connection. The back channel may also be used to receive ITV commands, software updates, and other types of data from the head end, an ITV producer, or the like.

Figure 3:
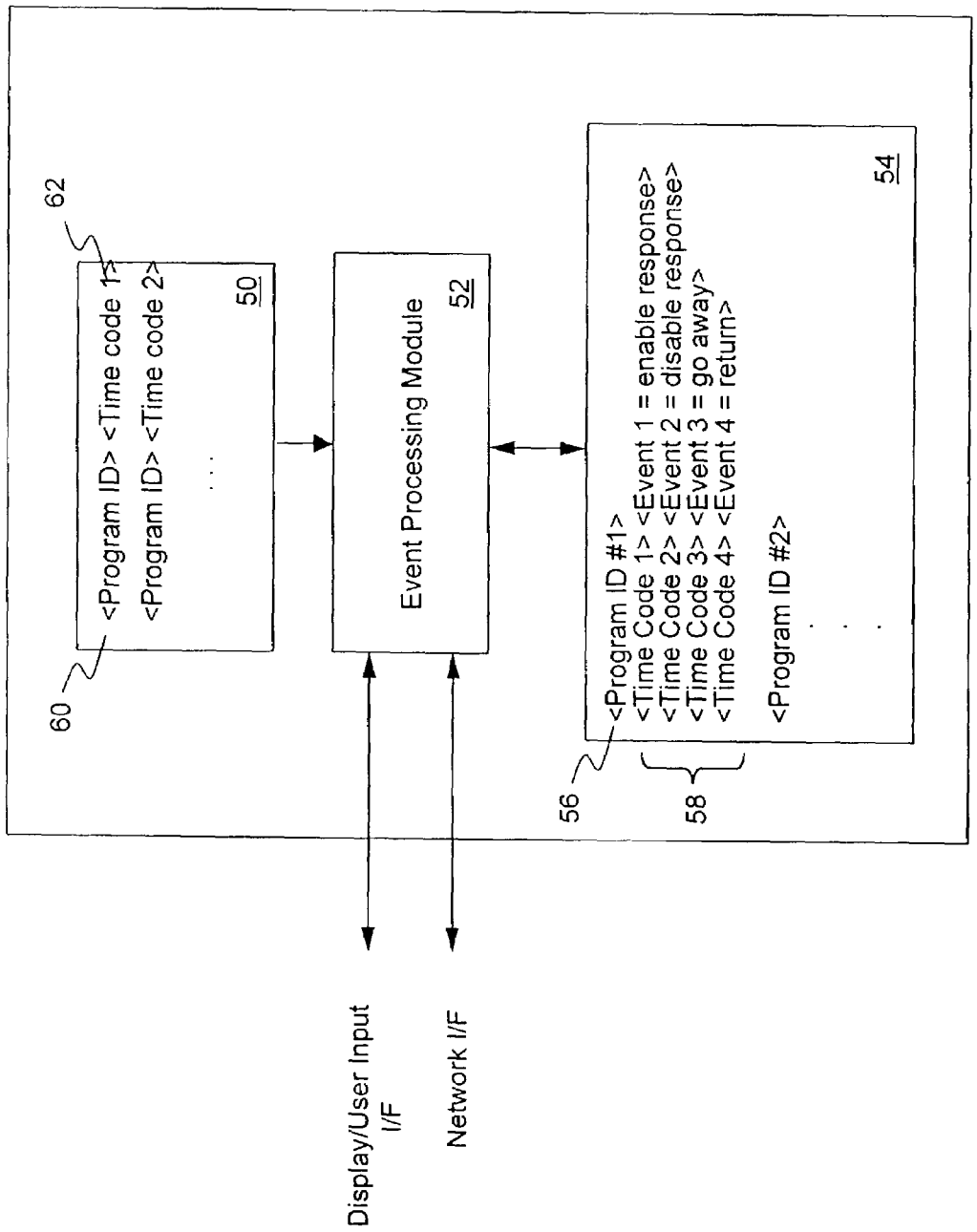
FIG. 3 is a more detailed block diagram of the ITV processor resident in the exemplary ITV receiver of FIG. 2 according to one embodiment of the invention.

FIG. 3 is a more detailed block diagram of the ITV processor 38 resident in the exemplary ITV receiver 30 according to one embodiment of the invention. The ITV processor 38 includes a command separator 50 software module configured to receive an ITV signal and retrieve embedded ITV data from the signal. According to one embodiment of the invention, the ITV data embedded in the ITV signal are universal codes that may be used by any type of ITV receiver for providing an interactive environment.

According to one embodiment of the invention, the universal codes embedded in the ITV signal are universal time codes 62 indicating a time in which one or more ITV events are to take place. A unique program identifier 60 may also be associated with each time code or set of time codes for identifying a program stored in memory to which the time codes are to be applied. Alternatively, instead of time codes, universal event codes that may be translated into particular ITV commands may be inserted in appropriate portions of the ITV signal.

The ITV processor 38 further includes an event processing module 52 coupled to a memory 54 for determining an ITV event to be provided based on the universal time code information. According to one embodiment of the invention, the memory 54 includes a program 58 that is associated with a particular program identifier 56. The program 58 includes one or more ITV commands and associated time codes indicating the time in which the ITV command is to be executed. The ITV commands stored in memory are generated according to the particular ITV platform supported by the processor 38.

ITV commands and associated events may be of a variety of types. For example, an "enable response" command may enable an ITV viewer to provide a response to a game show question. If a studio contestant has already provided the answer, a "disable response" command may disable a further response from the ITV viewer. Each time code may also be associated with a timeout period to end or create a default end to the period for a response. In this way, a viewer may be prohibited from extending a period for a response by interrupting, for example, the video signal and causing the "disable response" command not to be received.

Other exemplary ITV commands are "go away" and "return" commands for controlling the ITV environment during commercial breaks. The "go away" command may indicate that the ITV environment is being suspended during a commercial break, and the "come back" command may indicate that the ITV environment is being activated after a commercial break. Other commands may be URL links to particular web sites for retrieving and displaying ITV content provided by such web sites.

According to one embodiment of the invention, the program 58 may be loaded into the memory 54 via the back channel coupled to the network interface 36. Different types of programs may loaded based on the particular type of ITV platform supported by the ITV receiver. For example, a program for one type of ITV receiver may be HTML based while a program for another type of ITV receiver may be JAVA based. Additionally, different ITV content providers may provide different ITV content for the same show. For example, for a particular sporting show, one ITV content provider may provide game statistics while another content provider may provide player biographies. In this scenario, the program loaded into the memory 54 of the ITV receiver may differ based on the ITV content provider selected by the ITV viewer.

Figure 4:
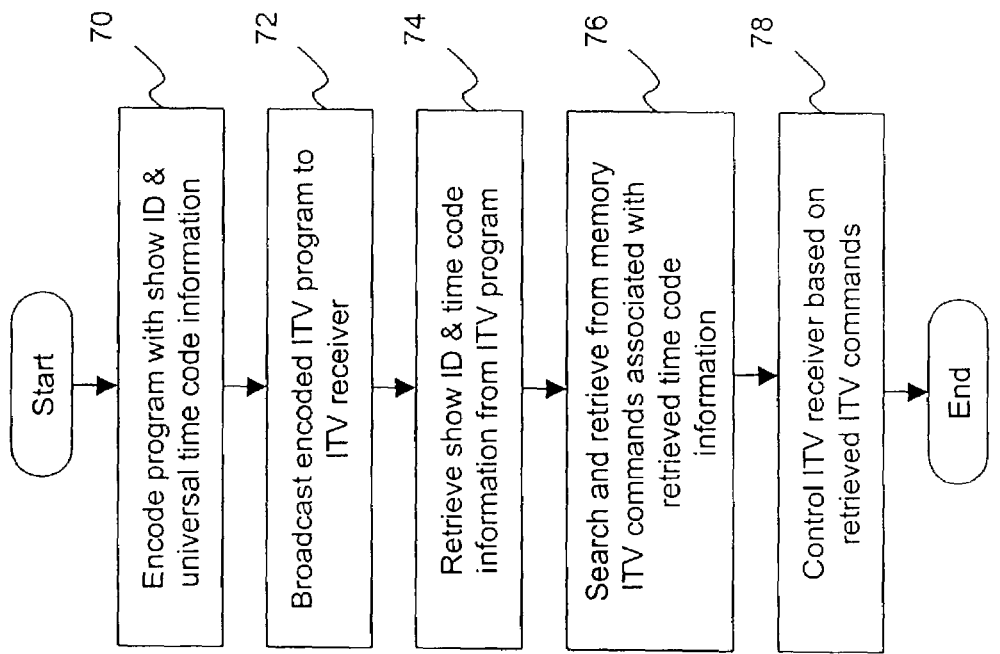
FIG. 4 is a flow diagram of a process for controlling different types of ITV receivers via a single ITV stream according to one embodiment of the invention.

FIG. 4 is a flow diagram of a process for controlling different types of ITV receivers via a single ITV stream according to one embodiment of the invention. The process starts, and in step 70, a broadcaster or separate ITV program producer encodes a television program with a program identifier and universal time code information. In step 72, the encoded ITV program is broadcast to viewers that may have access to one or more types of ITV receivers. In step 74, each particular receiver retrieves the time code information embedded in the received ITV program. In step 76, the ITV receiver searches its memory for ITV events associated with the retrieved program identifier and time code information. In step 78, the ITV receiver takes actions indicated by the retrieved ITV commands.

A person skilled in the art should appreciate that any number of ITV events could be synchronized to a particular television program without having to embed discrete commands generated according to a variety of differing formats for a variety of disparate ITV receivers. The present invention therefore allows efficient use of bandwidth while catering to different types of ITV receivers.

Although this invention has been described in certain specific embodiments, those skilled in the art will have no difficulty devising variations which in no way depart from the scope and spirit of the present invention. It is therefore to be understood that this invention may be practiced otherwise than is specifically described. Thus, the present embodiments of the invention should be considered in all respects as illustrative and not restrictive, the scope of the invention to be indicated by the appended claims and their equivalents rather than the foregoing description.

What is claimed is:

1. A method for providing an interactive television (ITV) program, the method comprising:
   generating by a broadcasting end a single ITV stream for controlling an interactive event display by first and second ITV receivers, wherein the first ITV receiver runs on a platform different than a platform on which the second ITV receiver runs, the singly generated ITV stream including a platform independent code configured to be decoded and interpreted by the first and second ITV receivers irrespectively of the particular ITV platform on which the first and second ITV receivers run, for providing the interactive event display;
   preloading into a first memory of the first ITV receiver, a first platform dependent ITV command generated according to the platform of the first ITV receiver;
   preloading into the second memory of the second ITV receiver, a second platform dependent ITV command generated according to the platform of the second ITV receiver;
   transmitting from the broadcasting end the singly generated ITV stream with the encoded platform independent code to both the first and second ITV receivers;
   retrieving by the first and second ITV receivers the platform independent code from the received ITV stream;
   searching by the first and second ITV receivers for respectively the first and second platform dependent ITV commands stored in respectively the first and second memories resident in respectively the first and second ITV receivers, based on the retrieved platform independent code;
   retrieving by the first and second ITV receivers from respectively the first and second memories the first and second platform dependent ITV commands associated with the platform independent code, based on the search; and
   executing by the first and second ITV receivers the retrieved first and second platform dependent ITV commands for controlling the interactive event display to users of the first and second ITV receivers.

2. The method of claim 1, wherein the platform independent code includes a time code indicative of a time in which the retrieved platform dependent ITV command is to be executed.

3. The method of claim 1, wherein the first platform dependent ITV command is for a JAVA based platform, and the second platform dependent ITV command is for an HTML based platform.

4. The method of claim 2, wherein the platform independent code includes a program identifier for identifying an executable program in the first and second ITV receivers, wherein the executable program stores the corresponding platform dependent ITV command.

5. A specific interactive television (ITV) program receiver selected from a plurality of ITV program receivers receiving ITV programs transmitted from a broadcasting end, the specific ITV program receiver running on a specific platform, the specific ITV program receiver comprising:
   a video input for receiving an ITV stream including a platform independent code, the ITV stream being generated by the broadcasting end, the ITV stream being configured to be decoded and interpreted by the plurality of ITV program receivers running on different platforms irrespectively of the particular ITV platform on which each of the plurality of ITV program receivers run, the ITV stream with the encoded platform independent code being transmitted to the specific ITV program receivers by the broadcasting end;
   a memory for preloading a platform dependent ITV command generated according to the platform of the specific ITV program receiver and storing the platform dependent ITV command in association with the platform independent code; and
   a processor coupled to the video input and the memory, the processor being configured to retrieve the platform independent code from the received ITV stream, search the memory for the platform dependent ITV command based on the retrieved platform independent code, retrieve the platform dependent ITV command associated with the platform independent code from the memory based on the search, and execute the retrieved platform dependent ITV command for controlling the interactive event.

6. The system of claim 5, wherein the platform independent code includes a time code, the method further comprising:
   executing the retrieved platform dependent ITV command at the time indicated by the time code.

7. The system of claim 5, wherein the platform dependent ITV command is for a JAVA based platform.

8. The system of claim 5, wherein the platform dependent ITV command is for an HTML based platform.

9. The system of claim 6, wherein the platform independent code includes a program identifier for identifying an executable program, wherein the executable program stores the platform dependent ITV command.

10. The system of claim 5 further comprising a network interface receiving the platform dependent ITV command for storing in the memory.

11. An interactive television (ITV) system comprising:
a broadcasting end generating a single ITV stream including a platform independent code configured to be decoded and interpreted by a plurality of ITV receivers running on different platforms irrespectively of the particular ITV platform on which each of the plurality of ITV receivers run;
a transmitter at the broadcasting end transmitting to the plurality of ITV receivers the singly generated ITV stream with the platform independent code;
a first of the plurality of ITV receivers running on a first ITV platform and including a first memory, wherein a first platform dependent ITV command generated according to the platform of the first ITV receiver is preloaded into the first ITV receiver and stored in the first memory in association with the platform independent code, the first ITV receiver receiving the singly generated ITV stream with the encoded platform independent code from the broadcasting end, retrieving the platform independent code from the received ITV stream, searching for the first platform dependent ITV command stored in the first memory based on the retrieved platform independent code, retrieving from the first memory the first platform dependent ITV command associated with the platform independent code based on the search, and executing the retrieved first platform dependent ITV command for providing the interactive event; and
a second of the plurality of ITV receivers running on a second ITV platform different from the first ITV platform, the second ITV receiver including a second memory, wherein a second platform dependent ITV command generated according to the platform of the second ITV receiver is preloaded into the second ITV receiver and stored in the second memory in association with the platform independent code, the second ITV receiver receiving the singly generated ITV stream with the encoded platform independent code from the broadcasting end, retrieving the platform independent code from the ITV stream, searching for the second platform dependent ITV command stored in the second memory based on the retrieved platform independent code, retrieving from the second memory the second platform dependent ITV command associated with the platform independent code based on the search, and executing the retrieved second platform dependent ITV command for providing the interactive event.

12. The system of claim 10, wherein the platform independent code includes a time code indicative of a time in which the retrieved first and second platform dependent ITV commands are to be executed.

13. The method of claim 1, wherein the platform independent code is encoded in a video portion of the ITV program.

14. The receiver of claim 5, wherein the platform independent code is encoded in a video portion of the ITV program.

15. The system of claim 11, wherein the platform independent code is encoded in a video portion of an ITV program.

16. The method of claim 1, wherein the platform independent code is a universal code that does not cater to any specific ITV platform.

17. The method of claim 1, wherein the executing of the first or second platform dependent ITV command includes:
retrieving ITV content associated with respectively the first or second platform dependent ITV command from a remote server; and
displaying the retrieved ITV content on a display.

18. The method of claim 1, wherein the first and second platform dependent ITV commands are stored in respectively first and second files, and the first and second files are preloaded to respectively the first and second ITV receivers via a backchannel, and the single ITV stream is broadcast to the first and second ITV receivers via a broadcast signal.

19. The method of claim 1 further comprising:
embedding a plurality of platform independent codes in the single ITV stream, each of the plurality of platform independent codes being embedded in an appropriate portion of the ITV stream for controlling timing of a corresponding one of a plurality of interactive event displays; and
executing by the first and second ITV receivers the retrieved first and second platform dependent ITV commands for controlling the timing of the corresponding one of the plurality of interactive event displays.

* * * * *